United States Patent
Haid et al.

(10) Patent No.: US 7,523,261 B2
(45) Date of Patent: Apr. 21, 2009

(54) METHOD AND CIRCUIT ARRANGEMENT FOR ADAPTING A PROGRAM TO SUIT A BUFFER STORE

(75) Inventors: Josef Haid, Graz (AT); Michael Smola, Munich (DE); Dietmar Scheiblhofer, Kaindorf (AT)

(73) Assignee: Infineon Technologies AG, Neubiberg (DE)

( * ) Notice: Subject to any disclaimer, the term of this patent is extended or adjusted under 35 U.S.C. 154(b) by 344 days.

(21) Appl. No.: 11/556,767

(22) Filed: Nov. 6, 2006

(65) Prior Publication Data
US 2008/0059754 A1    Mar. 6, 2008

(30) Foreign Application Priority Data
Aug. 31, 2006    (DE) .................. 10 2006 041 002

(51) Int. Cl.
*G06F 12/00* (2006.01)
(52) U.S. Cl. .................. 711/125; 711/202; 711/203; 711/214; 712/221; 712/300; 717/118; 717/135; 717/151; 717/159
(58) Field of Classification Search .................. 711/125, 711/202, 203, 214; 712/221, 300; 717/118, 717/135, 151, 159
See application file for complete search history.

(56) References Cited
U.S. PATENT DOCUMENTS

| | | | | |
|---|---|---|---|---|
| 5,454,091 A | * | 9/1995 | Sites et al. .................. 711/203 |
| 5,995,746 A | * | 11/1999 | Sites et al. .................. 712/220 |
| 6,021,469 A | * | 2/2000 | Tremblay et al. ........... 711/125 |
| 6,139,199 A | * | 10/2000 | Rodriguez .................. 717/159 |
| 6,532,531 B1 | * | 3/2003 | O'Connor et al. ........... 712/202 |
| 6,978,451 B2 | * | 12/2005 | Heeb ........................... 717/154 |

OTHER PUBLICATIONS

I. Piumarta, et al., "Optimizing direct threaded code by selective inlining. In: Proceedings of the ACM SIGPLAN 1998 conference on programming language design and implementation," Montreal, CA pp. 291-300.

A. Scott, et al., "Four-Way Superscalar PA-RISC Processors," Hewlett-Packard Journal, Aug. 1997, pp. 1-9.

* cited by examiner

*Primary Examiner*—Stephen C Elmore
(74) *Attorney, Agent, or Firm*—Dickstein, Shapiro, LLP.

(57) ABSTRACT

A method for changing a succession of instruction words including providing a set of machine words, each machine word being associated with an address from a set of addresses, providing a succession of instruction words having address information, the succession of instruction words prescribing a sequence of machine words which are intended to be processed by an arithmetic and logic unit which is coupled to a buffer store, altering the association between at least a portion of the set of machine words and at least a portion of the set of addresses, changing the address information in the succession of instruction words based on the alteration of the association, storing the changed succession of instruction words in a memory, and storing the set of machine words in the memory, so that it is possible to access the machine words using the associated addresses.

33 Claims, 3 Drawing Sheets

METHOD AND CIRCUIT ARRANGEMENT FOR ADAPTING A PROGRAM TO SUIT A BUFFER STORE

CROSS-REFERENCE TO RELATED APPLICATION

This application claims priority to German Patent Application Serial No. 102006041002.5, which was filed Aug. 31, 2006, and is incorporated herein by reference in its entirety.

FIELD OF THE INVENTION

The invention relates to a method for adapting a succession of instruction words to suit a buffer store, and also a circuit arrangement for processing the adaptable succession of instruction words.

BACKGROUND OF THE INVENTION

Besides the actual arithmetic and logic unit and a main memory in which a program to be executed is provided, a computer system can also comprise a buffer store. Buffer-stored data are accessed more quickly than the data stored in the main memory. The advantage of high access speed with simultaneously low power consumption usually entails the drawback that the buffer store is smaller than the main memory, however.

A data word which is to be processed in the arithmetic and logic unit can be accessed by virtue of the arithmetic and logic unit loading the data word which is to be processed from the buffer store if it is available there. If this is not the case, the data word is loaded from the main memory and is stored in the buffer store before or after the processing. This means the data already buffer-stored in the buffer store can be displaced by the new data word which is to be buffer stored.

There are various designs for the association of the data words which are to be buffer-stored with buffer-store locations in the buffer store. By way of example, data from the main memory can be associated with the buffer-store locations in the buffer store on the basis of the addresses of said data.

Buffer-storage may result in ineffective use of the buffer store if a plurality of data words which are frequently to be processed share one or a few buffer-store locations and displace one another, which means that, although the data words are required frequently, they repeatedly need to be loaded from the main memory. This effect can arise particularly disadvantageously if two data words which are to be processed alternately displace one another with every loading operation at a buffer-store location, which means that they have to be loaded from the main memory again with every loading operation. In such a case, the operation of the computer system with a buffer store can become slower than the operation of a computer system without a buffer store. In addition, it is also conceivable for buffer-store locations in other areas of the buffer store to be taken up by a word which has been called just once and which is then no longer required.

One situation in which such problems may arise is the use of virtual machines, such as what is known as a JVM, short for "Java Virtual Machine".

The program to be processed is in the form of a succession of instruction words, for example, which is also called byte-code. This is a type of intermediate code which refers to machine instructions and prescribes what sequence of machine instructions is to be supplied to the arithmetic and logic unit. The machine instructions are loaded for processing either from the main memory or from the buffer store.

Previous approaches to making better use of the buffer store have been of a more general nature with no account being taken of application-specific properties. The field of JVMs pursues the approach of developing special machine instructions optimized for Java. Secondly, there are software techniques for minimizing the number of instructions or byte-code instructions.

SUMMARY OF THE INVENTION

One aspect of the invention provides a method for changing a succession of instruction words, the method including providing a set of machine words, each machine word being associated with an address from a set of addresses, providing a succession of instruction words having address information, which succession of instruction words prescribing a sequence of machine words which are intended to be processed by an arithmetic and logic unit which is coupled to a buffer store, altering the association between at least a portion of the set of machine words and at least a portion of the set of addresses, changing the address information in the succession of instruction words based on the alteration of the association, storing the changed succession of instruction words in a memory, and storing the set of machine words in the memory, so that it is possible to access the machine words using the associated addresses.

BRIEF DESCRIPTION OF THE DRAWINGS

The invention is explained below using exemplary embodiments with reference to the drawings.

DETAILED DESCRIPTION OF THE INVENTION

Figure 1:
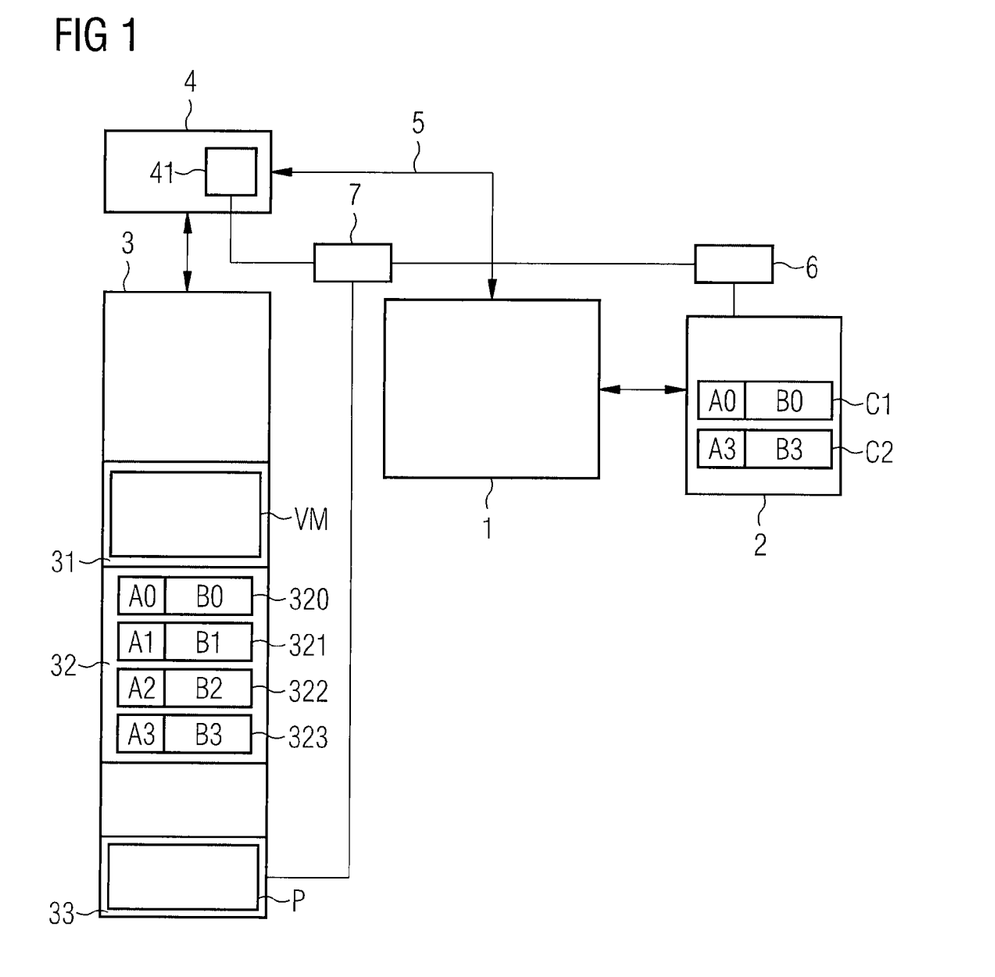
FIG. 1 shows a schematic illustration of an exemplary embodiment of a computer system.

FIG. 1 shows a schematic illustration of an exemplary embodiment of a computer system with an arithmetic and logic unit 1. A bus 5 couples the arithmetic and logic unit 1 to a memory controller 4 which comprises a lookup table 41. The memory controller 4 is connected to a memory 3 which comprises a plurality of areas 31, 32, 33. In addition, the arithmetic and logic unit 1 is coupled to a buffer store 2, which is also called a cache. The cache 2 comprises two memory locations C1, C2, for example. In addition, the arrangement comprises a detector 6 which is coupled to the buffer store in order to detect displacement processes in the buffer store. A changer 7 is coupled to the detector 6, the lookup table 41 and the memory 3.

An area 33 in the memory 3 stores a Java application P. The Java application comprises a succession of instruction words and is in the form of bytecode or intermediate code which is neither specifically suited to the arithmetic and logic unit 1 nor can be processed by it directly.

An interpreter for a virtual machine VM, which interpreter is stored in another area 31 of the memory 3, is used to associate with the instruction words in the succession of instruction words P a machine instruction or a static machine instruction sequence, also called "native code sequence", respectively, which are able to be executed by the processor directly. Both are subsequently called a "machine word". The machine words B0 B1, B2, B3 are stored in table form in another area 32 of the memory 3.

By way of example, FIG. 1 shows the storage of a set of machine words with a first machine word B0, a second machine word B1, a third machine word B2 and a fourth machine word B3. The set of machine words can be stored by storing the machine words B0, B1, B2, B3 at memory locations 320, 321, 322, 323 in the memory area 32 provided therefor which are able to be identified from their start address A0, A1, A2, A3. The intervals between the start addresses A0, A1, A2, A3 are equidistant. The machine words B0, B1, B2, B3 can be associated with the instruction words by virtue of every instruction word having an index which indicates the multiplier for the interval between the machine words. The associated machine word is identified by adding the product of interval and index from the first start address A0. By way of example, a third instruction word P2 with the index "2" thus has the associated third machine word B2 with the start address A2.

The memory 3 is accessed via the memory controller 4. The lookup table 41 can be used to associate virtual addresses which are used by the arithmetic and logic unit 1 with physical addresses A0, A1, A2, A3 at which the machine words B0, B1, B2, B3 are stored.

The succession of instruction words P prescribes the order of the machine words B0, B1, B2, B3 which are to be processed by virtue of each instruction word in the succession of instruction words P having an associated machine word B0, B1, B2, B3. The machine word B0, B1, B2, B3 associated with the instruction word which is to be processed is ascertained using the virtual machine VM and is supplied to the arithmetic and logic unit 1, to be more precise to a decoder in a processor in the arithmetic and logic unit 1. The machine words B0, B1, B2, B3 can be executed directly. Hence, execution of the succession of instruction words P involves the associated succession of machine words being read from the memory 3 and being supplied to the arithmetic and logic unit 1.

Upon being supplied for the first time, the machine word is processed by the arithmetic and logic unit 1 and is stored at one of the buffer-store locations C1, C2 in addition to address information A_0, A_3 in order to identify the buffer-stored machine word B0, B3. When the same machine word B0, B3 is next accessed, a check is first of all performed to determine whether this machine word has been provided in the buffer store 2. If this is the case, it is supplied to the arithmetic and logic unit 1 from the buffer store 2. In the other case, the machine word is supplied to the arithmetic and logic unit 1 from the memory 3 by the bus 5 using the memory controller 4 and is buffer-stored in the buffer store 2.

The internal organization of the buffer store may involve associating a buffer-store location on the basis of the address of the machine word. In this context, a plurality of buffer-store locations can be combined to form sets. The association of the machine word which is to be buffer-stored with a set is dependent on the latter's address. Within the set, a machine word is stored at one of the buffer-store locations and can be identified from the address information, for example a portion of the address. Advantageously, the association of the buffer-store locations in the buffer store for the machine words which are to be buffer-stored is dependent on a physical or virtual address, which means that the altered association of addresses affects the buffer-storage.

FIG. 1 shows what is known as a two-way cache as an exemplary embodiment of the cache. The first and fourth machine words B0, B3 are provided in the buffer-store use shown for the buffer store 2. The second and third machine words B1 and B2 can be loaded from the memory 3.

An exemplary embodiment of a detector 6 can detect displacement processes through the coupling to the buffer store 2. Another exemplary embodiment of a detector detects these displacement processes indirectly by monitoring which machine words are loaded from the memory 3 with what frequency or in what order. From this, it can be inferred that they are not or no longer in the buffer store 2. In such a case, the detector 6 can be coupled to the arithmetic and logic unit 1 or to the memory controller 4. In another exemplary embodiment, the detector 6 is integrated in the arithmetic and logic unit 1 in the form of software.

It should be noted that the arrangement shown in FIG. 1 is just one exemplary embodiment of a computer system. Other exemplary embodiments have other architectures and other couplings for the buffer store 2 to the arithmetic and logic unit 1 and the memory 3, for example by virtue of the buffer store 2 being coupled between the memory controller 4 and the arithmetic and logic unit 1.

An advantage of these exemplary embodiments is that the storage or association of the machine words can be altered in order to adapt the program to suit the buffer store such that the system power is improved.

The circuit arrangement takes the detected displacement processes as a basis for adapting the instruction words/machine words association and the succession of instruction words in order to make better use of the buffer store 2 without taking any direct action in the operation of the buffer store itself. This practice is explained below.

Figure 2:
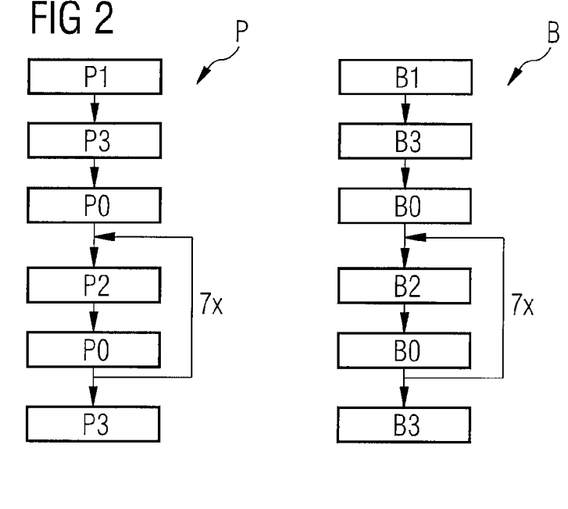
FIG. 2 shows a flowchart of an exemplary succession of instruction words and of an associated succession of machine words.

FIG. 2 illustrates a sequence containing instruction words P0, P1, P2, P3 in an exemplary succession of instruction words P. The loop means that the first and third instruction words P0, P2 occur particularly frequently.

The first instruction word P0 has the first machine word B0 associated with it, the second instruction word P1 has the second machine word B1 associated with it, the third instruction word P2 has the third machine word B2 associated with it and the fourth instruction word P3 has the fourth machine word B3 associated with it. Hence, the first and third machine words B0, B2 occur particularly frequently in the succession of machine words B.

Figure 3:
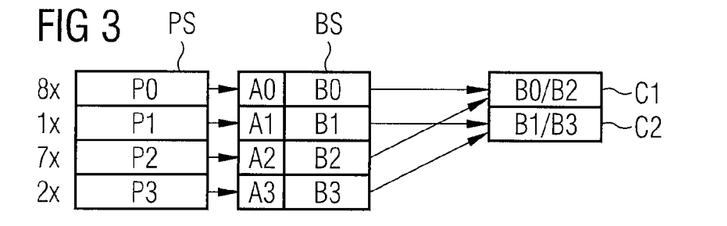
FIG. 3 shows a diagram illustrating the utilization of an exemplary embodiment of a buffer store having buffer-store locations with which machine words are associated.

FIG. 3 shows a diagram illustrating the utilization of a buffer store with the buffer-store locations C1, C2, for example.

In FIG. 3, the frequency of the instruction words in the succession of instruction words P from FIG. 2 is listed for the instruction words P0, P1, P2, P3 in the set of instruction words PS. The first instruction word P0 occurs eight times, and the third instruction word P2 occurs seven times. The second instruction word P1 and the fourth instruction word P3 occur only once or twice and hence much less than the other two instruction words P0, P2.

Each instruction word P0, P1, P2, P3 in the set of instruction words PS has an associated machine word B0, B1, B2, B3 from the set of machine words BS. These machine words B0, B1, B2, B3 are respectively stored at a memory location with a start address A0, A1, A2, A3. The association with the instruction words P0, P1, P2, P3 is made by way of reference to the appropriate addresses A0, A1, A2, A3 of the associated machine words B0, B1, B2, B3, so that the arithmetic and logic unit 1 loads the machine word B0, B1, B2, B3 at the allocated address A0, A1, A2, A3. This reference can be made, by way of example, in the above manner of the calculability of the address of the machine word from the index of the bytecode.

When the succession of instruction words P illustrated in FIG. 2 is processed, the first and third machine words B0, B2 are stored at the same, first buffer-store location C1 in the buffer store. The second and fourth machine words B1, B3 are stored at the other buffer-store location C2.

The alternating loading of the first and third machine words B0, B2, which are both buffer-stored at the first buffer-store location C1, means that reciprocal displacement occurs at this buffer-store location C1, while the second and fourth machine words B1, B3 at the other buffer-store location C2 are largely unused. This drawback stems from the unfavorable arrangement of the set of machine instructions BS in terms of buffer store use. Particularly the reciprocal calling of the first and third machine words B0, B2 when processing the succession of machine words B illustrated in FIG. 2 is time consuming, since every call requires the first or third machine word B0, B2 which is to be processed to be loaded from the memory 3. The association with the buffer-store locations C1, C2 is dependent on the succession of instruction words P which is to be processed and is application-specific.

Figure 4:
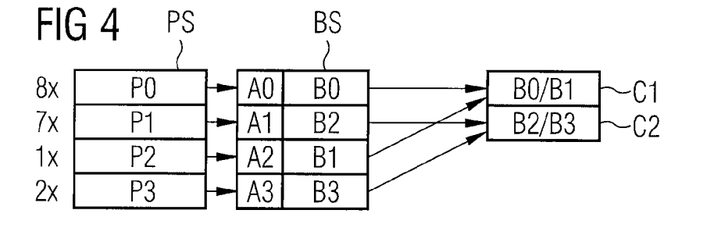
FIG. 4 shows a diagram illustrating the utilization of the exemplary embodiment of the buffer store with a changed association between the machine words and the buffer-store locations.

FIG. 4 shows the utilization of the buffer store when processing the same succession of machine words B which has been shown in FIG. 2 when the association between the machine words B0, B1, B2, B3 and the buffer-store locations C1, C2 has been altered. To avoid repetition, only differences over the preceding FIG. 3 are discussed.

The second and third machine words B1, B2 have exchanged the memory locations. The second machine word B1 is now stored at the memory location with the address A2, which previously stored the third machine word B2. The third machine word B2 is now stored at the memory location with the address A1, which previously stored the second machine word B1.

To ensure that when processing the succession of instruction words P, which prescribes the order of the machine words, a changed succession of machine words B is implemented, it is necessary to alter the succession of instruction words P. In this case, the first and third instruction words P0 and P2 within the succession of instruction words P are swapped, so that now the first instruction word P1, with which the third machine word B2 is associated via the address A1, however, is called seven times.

The first machine word B0 and the second machine word B1 are stored in the first buffer-store area C1 when the succession of instruction words P is processed, and the third machine word B2 and the fourth machine word B3 are stored in the second buffer-store area C2. The frequently loaded first and third machine words B0, B2 now remain stored in the first or second buffer store C1, C2 for longer, since they are now barely displaced by the rarely occurring second or fourth machine word B1, B3.

In another exemplary embodiment too, only the associations between single or a plurality of pairs of machine words are swapped with one another, which means that, by way of example, a first machine word, which was associated with the first address, is associated with a second address and a second machine word, which was associated with the second address, is now associated with the first address. The association is altered by storing the second machine word at a memory location with the first address. When the association is swapped, the memory locations at which the first and second machine words are stored are therefore exchanged. This reprogramming makes it possible to achieve static re-sorting, which requires hardly any additional hardware complexity.

However, more complex address manipulations are also possible in other exemplary embodiments in order to alter the association.

In these exemplary embodiments, the addresses which can be used to access the machine words are altered, which is also called "remapping". An advantage of the exemplary embodiments is that remapping program parts, for example in a Java bytecode, allows an increase in the buffer-store hit rate, also called cache hit rate, and consequently an increase in the system performance to be achieved. It is also advantageous to adapt the succession of instruction words such that the sequence is processed in the same order as before the succession of instruction words and the association were changed. Although they are executed in an unchanged order, the machine words to be processed are stored at other addresses, which allows better utilization of the buffer store and a reduction in displacement processes in the buffer store to be achieved.

Figure 7:
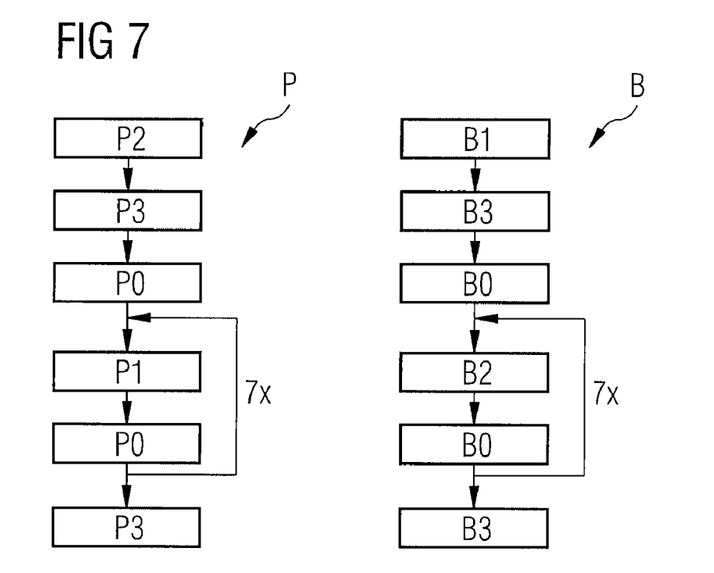
FIG. 7 shows a flowchart of the changed succession of instruction words and of the associated succession of machine words.

FIG. 7 shows the alteration in the succession of instruction words P, which continues to have the same associated succession of machine words B as in FIG. 2 as a result of the altered association, however.

Advantageously, the changes made to the association are based on previously implemented statistics for the displacement processes during processing of the original succession of instruction words or a portion thereof. Advantageously, the particular displacement processes are taken as a basis for associating machine words with the at least one portion of the machine words whose association with the addresses is being altered. The order of the instruction words is adapted. This allows an improvement in the cache hit rate.

The altered association is based on statistics or analysis relating to the displacement processes in the buffer store's buffer-store locations C1, C2. The frequency of the displacement processes can be ascertained using a software tool which takes the succession of instruction words P and the buffer store 2 in question as a basis for ascertaining the displacement processes by simulation. This tool may be integrated in the conventional order with a compiler, assembler, linker, mask generator and, as part of a post-processing step, can recode the bytecodes into an optimized order and can produce the arrangement of the set of machine instructions again in accordance therewith. On the basis of the result, the succession of instruction words P and the storage of the set of machine words BS can be modified in order to use the buffer store 2 in optimum fashion. This involves static remapping, where the hardware for the actual processing of the succession of instruction words is unchanged. In such a case, the detector 6 in FIG. 1 is not required, since its task is undertaken by the software tool.

Alternatively, the statistics or the analysis relating to the displacement processes in the course of a test run can be undertaken by an exemplary embodiment of the detector 6.

On the basis of the result, the association and the succession of instruction words P are altered.

In the case of the exemplary embodiment stated above, the lookup table is optional, since its entries are not altered for the altered association between the instruction words B0, B1, B2, B3 and the addresses A0, A1, A2, A3. The principle described above can therefore also be used in exemplary embodiments without a lookup table 41.

Figure 5:
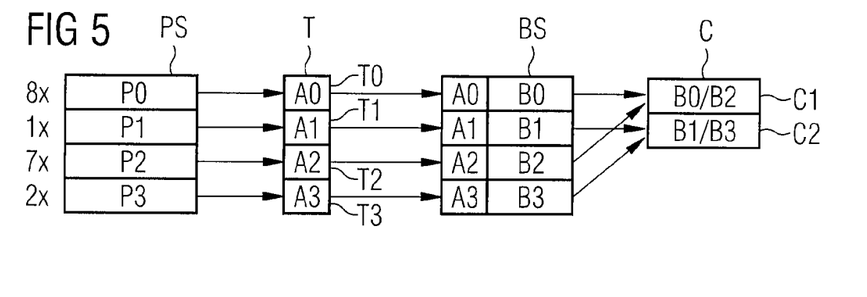
FIG. 5 shows a diagram illustrating the utilization of a further exemplary embodiment of a buffer store with which machine words are associated.

FIG. 5 shows the timing diagram for another exemplary embodiment, in which the instruction words P0, P1, P2, P3 in the set of instruction words PS are associated with the machine words B0, B1, B2, B3 in the set of machine words BS via a table T. The instruction words P0, P1, P2, P3 are associated with entries T0, T1, T2, T3 in the table T. The first instruction word P0 is associated with the first entry T0, the second instruction word P1 is associated with the second entry T1, the third instruction word P2 is associated with the third entry T2 and the fourth instruction word P3 is associated with the fourth entry T3. The entries T0, T1, T2, T3 respectively refer to the address A0, A1, A2, A3 of the memory locations at which one of the machine words B0, B1, B2, B3 is stored.

Figure 6:
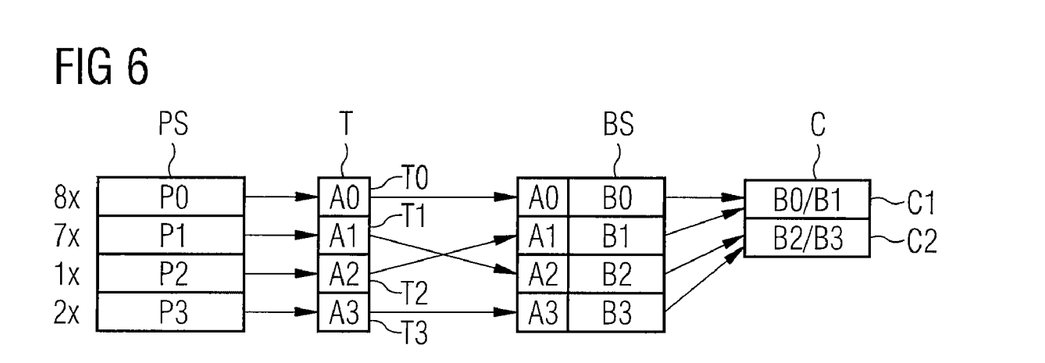
FIG. 6 shows a diagram illustrating the utilization of the further exemplary embodiment of the buffer store with a changed association between the machine words and the buffer store locations.

FIG. 6 shows the timing diagram with an altered association. In this case, the association is altered by altering those addresses entered in the table T to which a reference is made. The addresses A1, A2 in the second and third table entries T1, T2 have been swapped. Hence, the third machine word B2 is now associated with the second instruction word P1 and vice versa. This achieves the same, improved utilization for the buffer store as for the previous exemplary embodiment in FIG. 4. Reference is also made to FIG. 7 for the order of instruction words and machine words which is obtained for the second exemplary embodiment.

In exemplary embodiments such as the ones described above, the association is altered without reprogramming the machine words. Rather, the addresses which can be used to identify the machine words are altered. By way of example, this is done by altering a first table entry, which refers to the first address of the first memory area for storing the first machine word, and a second table entry, which refers to the second address of the second memory area for storing the second machine word. The association is altered by altering the first table entry such that it refers to the second address. The machine words are accessed via the table entries which refer to the addresses of the memory locations. Such addresses are also called physical addresses.

Advantageously, the table entries comprise the physical address of the memory area to which reference is made and a further, so-called virtual, address at which the arithmetic and logic unit accesses the machine word at the memory location. The table is used to associate the virtual addresses with physical addresses. This association can be altered with less complexity than reprogramming, which results in more flexibility.

The changed association means that the succession of instruction words can be adapted such that the original sequence of machine words continues to be processed in the arithmetic and logic unit so that the program can be executed unchanged. In the original succession of instruction words, the second address is respectively associated with second instruction words. The first instruction word is associated with the first address. The succession of instruction words is changed such that the second instruction words in the succession of instruction words are respectively replaced by the first instruction word. This means that the second machine word is processed when the first instruction word is called.

Provision is advantageously made for displacement processes at the buffer-store locations to be ascertained when processing the machine word sequence with the original association in order to detect, in particular, frequently called machine words which have already been displaced from the buffer store when they are next called. The change in the succession of instruction words and the alteration in the association are made such that a buffer-store hit rate, or cache hit rate, in the buffer store is improved when the associated machine word sequence is processed.

In one exemplary embodiment, these displacement processes can be determined in anticipation of the actual processing by a simulation tool. This is advantageous in the case of the exemplary embodiments with static re-sorting. The simulation step can take place before the set of machine words is stored, which means that the machine words are actually stored at the memory locations with the changed association. The re-sorting can take place before the succession of instruction words is processed for the first time, which is advantageous particularly in the case of the static method, in which the machine words are stored in altered fashion.

Alternatively, the displacement processes can easily be detected by processing the machine word sequence before the alteration step and the change step in the course of a test run.

The exemplary embodiments with use of the table entries relate to a dynamic method in which the association of the addresses can be altered while the succession of instruction words is being processed. In this case, at least some of the machine word sequence is processed. The statistics produced in this context about the displacement processes are then taken as a basis for determining and performing the necessary alteration steps and change steps before the further machine word sequence is processed. Alternatively, it is also possible to carry out a test run for ascertaining the displacement processes.

Advantageously, in one exemplary embodiment the method is applied in the case of programs for virtual machines, which allows the programs in hardware-independent form to be adapted to suit the buffer store.

This alteration in the association which is illustrated in FIGS. 5 and 6 is made with hardware support using the lookup table 41 already illustrated in FIG. 1. An exemplary embodiment of a lookup table may be produced in a separate memory area or in a portion of the memory 3 which is provided therefor. Another exemplary embodiment of a lookup table 41 is covered by a memory management unit, also called an MMU for short, which is used to associate a physical address with a virtual address. It is also conceivable to have exemplary embodiments using management tables which are used to manage nonvolatile memory contents. These tables can be used for dynamically sorting the machine words.

The remapping using the lookup table 41 can take place dynamically by virtue of the detector 6 detecting the displacement processes during processing of the succession of instruction words 6. On the basis of the detected displacement processes, the change unit 7 is used to adapt the entries T0, T1, T2, T3 in the lookup table 41 and the succession of instruction words P.

The dynamic remapping allows optimized remapping to be performed for each program in order to achieve the probability of hits for the buffer store 2 and hence an increase in system performance. Another exemplary embodiment comprises components which are already provided for other purposes and which are extended by the remapping in order to achieve optimization of performance in this manner. Remapping requires programs provided for this purpose and specially suited APIs.

The advantage of these exemplary embodiments with a table is the greater degree of flexibility, which, in exemplary embodiments of systems with reloadable programs, allows these to be optimized in terms of buffer-store utilization during initialization. This means that not only is the virtual machine optimized for a program but it can also be adapted dynamically to suit other programs. For systems with reloadable programs, recompilation of the loading time is conceivable, which is accompanied by a high level of computation power. It is also conceivable for the reloadable programs to comprise information about the buffer-store use, which means that adapting can be performed on the basis thereof.

These exemplary embodiments require additional hardware complexity for the table or adaptation of a table which is already present in an MMU.

The diagrams in FIGS. 3 and 4 have been used to illustrate that the alteration in the association can be made statically by altering the storage of the machine words. In one exemplary embodiment, a first memory location is provided for storing a first machine word and has a first address. A second memory location is provided for storing a second machine word. This has a second address. To alter this storage, the circuit arrangement is designed to store the second machine word at the first memory location. When the association is swapped, the first machine word is stored at the second memory location. Besides paired swapping, exemplary embodiments with other associations are also conceivable in which the association between at least one portion of the addresses and at least one portion of the memory locations is altered.

The diagrams in FIGS. 5 and 6 have been used to illustrate the operation of an exemplary embodiment with an association means for storing a table with table entries. In one exemplary embodiment, a first table entry refers to a first address for a first memory area for storing a first machine word, and a second table entry refers to a second address for a second memory area for storing a second machine word. The references can be altered such that the first table entry refers to the second address. In this refinement too, the change in association can be made by means of, if appropriate, multiple paired swapping or other association specifications. This alternative refinement is more flexible, since changing the association requires only that the references be altered. Complex restorage processes are not required.

In the exemplary embodiments, the succession of instruction words comprises instruction words from a set of instruction words with a plurality of instruction words, each instruction word in the set of instruction words having the address of one of the machine words from the set of machine words associated with it. In this way, an order is prescribed for machine word addresses which are to be called.

The memory location from which the machine word to be processed can be loaded is identified by means of the address which is associated with the memory area. In one exemplary embodiment, the memory area has an associated virtual address from the arithmetic and logic unit. During loading, the association unit associates the physical address with the virtual address. The association is altered in a similar manner by virtue of another physical address being associated with the virtual address. In this context, the association means may be in the form of what is known as the lookup table with alterable associations in a memory management unit, MMU for short, which translates virtual addresses into physical addresses.

So that the unaltered succession of machine words is implemented even when the association has been altered, the succession of instruction words is altered. In one exemplary embodiment, second instruction words in the succession of instruction words which are associated with the second address can be changed by the change unit such that the second instruction words in the succession of instruction words are respectively replaced by the first instruction word. When the association is swapped in pairs, the first instruction words are replaced by the second instruction words. A similar situation applies when the instruction words are associated with the table entries.

To detect the displacement processes for the original succession of instructions, a detector is provided. Detection is advantageously effected in the course of a test run. Depending on the detected displacement processes, when the lookup table is used the entries can be altered either after a test run for the succession of instruction words which is to be optimized or alternatively while it is being processed, in order to infer the future displacement processes on the basis of the statistics for the previous displacement processes.

In one exemplary embodiment, a changer is also provided which changes the association and the succession of instruction words such that the system performance is improved. The changer is designed to alter the association of the machine words and to change the relevant instruction words in the succession of instruction words.

What is claimed is:

1. A method for changing a succession of instruction words, the method comprising:
providing a set of machine words, each machine word being associated with an address from a set of addresses;
providing a succession of instruction words having address information, the succession of instruction words prescribing a sequence of machine words which are intended to be processed by an arithmetic and logic unit which is coupled to a buffer store;
altering the association between at least a portion of the set of machine words and at least a portion of the set of addresses;
changing the address information in the succession of instruction words based on the alteration of the association;
storing the changed succession of instruction words in a memory; and
storing the set of machine words in the memory, so that it is possible to access the machine words using the associated addresses.

2. The method as claimed in claim 1, wherein the changing of the succession of instruction words and the alteration of the association are dependent on displacement processes in the buffer store which occur during processing of the sequence in the arithmetic and logic unit.

3. The method as claimed in claim 2, wherein the displacement processes are determined by a simulation tool.

4. The method as claimed in claim 2, wherein the displacement processes are detected by processing the sequence in the arithmetic and logic unit before the association is altered and the address information is changed.

5. The method as claimed in claim 1, wherein the address information in the succession of instruction words is changed, so that accordingly the sequence of machine words to be processed is not altered.

6. The method as claimed in claim 1, wherein the succession of instruction words comprises instruction words from a set of instruction words, and each instruction word in the set of instruction words has the associated address of one of the machine words in the set of machine words.

7. A method for changing a succession of instruction words, the method comprising:
providing a set of machine words, each machine word being associated with an address from a set of addresses;

providing a succession of instruction words having address information, the succession of instruction words prescribing a sequence of machine words which are intended to be processed by an arithmetic and logic unit which is coupled to a buffer store;

altering the association between at least a portion of the set of machine words and at least a portion of the set of addresses, so that a different address from the at least one portion of the set of addresses than previously is associated with each machine word from the at least one portion of the set of machine words;

changing the address information in the succession of instruction words based on the alteration of the association;

storing the changed succession of instruction words in a memory; and storing the machine words stored at the memory location having the address which is associated with the machine word.

8. The method as claimed in claim 7, wherein displacement processes in a buffer store are ascertained during processing of the sequence in the arithmetic and logic unit, and the changing of the succession of instruction words and the alteration of the association of the at least one portion of the set of machine words are dependent on the ascertained displacement processes.

9. The method as claimed in claim 7, further comprising:
providing a first memory location having a first address for storing a first machine word and a second memory location having a second address for storing a second machine word; and altering the association by storing the second machine word at the first memory location.

10. The method as claimed in claim 9, wherein the set of instruction words comprises a first instruction word, which is associated with the first address, and a second instruction word, which is associated with the second address, and wherein the changing involves every second instruction word in the succession of instruction words being replaced by the first instruction word.

11. The method as claimed in claim 10, wherein the first machine word is stored at the second memory location and the first instruction words in the succession of instruction words are replaced by second instruction words.

12. The method as claimed in claim 7, wherein the sequence is generated from the succession of instruction words by a virtual machine.

13. A method for changing a succession of instruction words, the method comprising:
providing a set of machine words, each machine word being associated with a virtual address from a set of addresses;

providing a succession of instruction words having address information, the succession of instruction words prescribing a sequence of machine words which are intended to be processed by an arithmetic and logic unit which is coupled to a buffer store;

altering the association between at least a portion of the set of machine words and at least a portion of the set of addresses, so that a different address from the at least one portion of the set of addresses than previously is associated with each machine word from the at least one portion of the set of machine words;

changing the address information in the succession of instruction words based on the alteration of the association;

storing the changed succession of instruction words in a memory;

storing the machine words from the set of machine words; and storing information describing the altered association.

14. The method as claimed in claim 13, wherein displacement processes in a buffer store are ascertained during processing of the sequence in the arithmetic and logic unit, and the changing of the set of instruction words and the alteration of the association for the at least one portion of the set of machine words are dependent on the ascertained displacement processes.

15. The method as claimed in claim 13, wherein the information describing the association comprises the virtual addresses, and each virtual address refers to a memory location at which one of the machine words is stored.

16. The method as claimed in claim 15, wherein the describing information comprises a first virtual address and a second virtual address, the first virtual address refers to a first memory location for storing a first machine word, the second virtual address refers to a second memory location for storing a second machine word, and during the alteration of the association the first virtual address refers to the second memory location.

17. The method as claimed in claim 16, wherein the set of instruction words comprises a first instruction word, which is associated with the first address, and a second instruction word, which is associated with the second address, and wherein the changing involves the second instruction words in the succession of instruction words being respectively replaced by the first instruction word.

18. The method as claimed in claim 17, wherein the second address refers to the first memory location and the first instruction words in the succession of instruction words are respectively replaced by the second instruction word.

19. The method as claimed in claim 14, wherein the displacement processes are detected by processing the sequence before the association is altered and the address information is changed.

20. The method as claimed in claim 13, wherein the changing of the succession of instruction words and the alteration of the association are performed after a portion of the sequence has been processed.

21. The method as claimed in claim 13, wherein the sequence is generated from the succession of instruction words by a virtual machine.

22. A circuit arrangement for processing a succession of machine words in an arithmetic and logic unit, the circuit arrangement comprising:
a first memory having a plurality of memory locations with respective associated addresses, the first memory being designed to store a set of machine words, with each machine word being able to be stored at one of the memory locations;

a second memory for storing a succession of instruction words which prescribes a succession of machine words which are to be processed in the arithmetic and logic unit; and a buffer store having buffer store locations for buffer-storing machine words, wherein the arithmetic and logic unit for processing the succession of machine words is coupled to the first memory, the second memory, and the buffer store, and is designed to load a machine word which is to be processed from the buffer store if the machine word is available there or to load the machine word from the first memory and to store the machine word at one of the buffer-store locations in the buffer store, and wherein the circuit arrangement alters the association between at least one portion of the set of machine words and at least one portion of the set of address words and changes the succession of instruction words, so that the accordingly prescribed succession of machine words which are to be processed is unaltered.

23. The circuit arrangement as claimed in claim 22, wherein the buffer store is designed to associate the buffer-store locations with the machine words which are to be buffer-stored based on the addresses of the memory locations at which the machine words are stored.

24. The circuit arrangement as claimed in claim 22, further comprising a first memory location or storing a first machine word having a first address, and a second memory location for storing a second machine word having a second address, and wherein the circuit arrangement is designed to store the second machine word at the first memory location and/or to store the first machine word at the second memory location.

25. The circuit arrangement as claimed in claim 22, wherein the succession of instruction words comprises instruction words from a set of instruction words, wherein the set of instruction words comprises a first instruction word, which is associated with a first address, and a second instruction word, which is associated with a second address, and wherein the circuit arrangement is designed to replace the second instruction words in the succession of instruction words with the respective first instruction words and/or to replace the first instruction words in the succession of instruction words with the respective second instruction words.

26. A circuit arrangement for processing a succession of machine words in an arithmetic and logic unit, the circuit arrangement comprising:
   a first memory having a plurality of memory locations with respective associated virtual addresses, the first memory being designed to store a set of machine words, with each machine word being able to be stored at one of the memory locations;
   an association unit for storing an association between the virtual addresses and the memory locations;
   a second memory for storing a succession of instruction words which prescribes a succession of machine words which are to be processed in the arithmetic and logic unit; and
   a buffer store having buffer-store locations for buffer-storing machine words,
   wherein the arithmetic and logic unit for processing the succession of machine words is coupled to the first memory, the second memory, the buffer store, and the association unit, and is designed to load a machine word which is to be processed from the buffer store if the machine word is available there or to load the machine word from the first memory and to store the machine word at one of the buffer-store locations in the buffer store, and
   wherein the circuit arrangement alters the association between at least one portion of the set of machine words and at least one portion of the set of address words and changes the succession of instruction words, so that the accordingly prescribed succession of machine words which are to be processed is unaltered.

27. The circuit arrangement as claimed in claim 26, wherein the arithmetic and logic unit assigns the virtual addresses to the memory locations at which the machine words are stored, and wherein the buffer store is designed to associate the buffer-store locations with the machine words which are to be buffer-stored based on the virtual addresses.

28. The circuit arrangement as claimed in claim 26, further comprising a detector designed to detect displacement processes at the buffer-store locations in the buffer store which occur during buffer-storage of machine words when at least one section of the succession of machine words is being processed.

29. The circuit arrangement as claimed in claim 26, wherein the association unit stores a table having a first and a second table entry, wherein the first table entry refers to a first physical address for a first memory location for storing a first machine word, and the second table entry refers to a second physical address for a second memory location for storing a second machine word, and wherein the references can be altered, so that the first table entry refers to the second address and/or so that the second table entry refers to the first address.

30. The circuit arrangement as claimed in claim 29, wherein the first table entry comprises the first virtual address and the physical address to which reference is made, and wherein the second table entry comprises the second virtual address and the physical address to which reference is made.

31. The circuit arrangement as claimed in claim 26, wherein the succession of instruction words comprises instruction words from a set of instruction words, wherein each instruction word in the set of instruction words has an associated table entry, wherein the set of instruction words comprises a first instruction word, which is associated with the first table entry, and a second instruction word, which is associated with the second table entry, and wherein the circuit arrangement is designed to replace the second instruction words in the succession of instruction words with the respective first instructions word and/or to replace the first instruction words in the succession of instruction words with the respective second instruction words.

32. The circuit arrangement as claimed in claim 26, further comprising a changer, coupled to the second memory, to the association unit, and to the detector, for altering the association and changing the succession of instruction words during or after the processing of the succession of machine words.

33. A circuit arrangement for processing a succession of machine words in an arithmetic and logic means, the circuit arrangement comprising:
   a first memory means, which has a plurality of memory locations with respective associated addresses, for storing a set of machine words, each machine word being able to be stored at one of the memory locations;
   a second memory means for storing a succession of instruction words which prescribes a succession of machine words which are to be processed in the arithmetic and logic means; and
   a buffer means having buffer store locations for buffer-storing machine words,
   wherein the arithmetic and logic means for processing the succession of machine words is coupled to the first memory, the second memory, and the buffer store, and is for loading a machine word which is to be processed from the buffer store if the machine word is available there or for loading the machine word from the first memory and to store the machine word at one of the buffer-store locations in the buffer store, and
   wherein the circuit arrangement alters the association between at least one portion of the set of machine words and at least one portion of the set of address words and changes the succession of instruction words, so that the accordingly prescribed succession of machine words which are to be processed is unaltered.

* * * * *